United States Patent
Kim et al.

(10) Patent No.: US 9,813,356 B1
(45) Date of Patent: Nov. 7, 2017

(54) CALCULATING BANDWIDTH INFORMATION IN MULTI-STAGE NETWORKS

(71) Applicant: Amazon Technologies, Inc., Seattle, WA (US)

(72) Inventors: Minsung Kim, San Jose, CA (US); Ashi Ramachandran Sudhakumari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 15/042,077

(22) Filed: Feb. 11, 2016

(51) Int. Cl.
*H04L 12/933* (2013.01)
*H04L 12/721* (2013.01)

(52) U.S. Cl.
CPC .......... *H04L 49/1515* (2013.01); *H04L 45/44* (2013.01)

(58) Field of Classification Search
CPC .............................. H04L 49/1515; H04L 45/44
See application file for complete search history.

(56) References Cited

U.S. PATENT DOCUMENTS

| | | | |
|---|---|---|---|
| 5,754,120 A | 5/1998 | Argentati | |
| 2004/0240437 A1* | 12/2004 | Fraser | H04L 45/24 370/380 |
| 2006/0209816 A1 | 9/2006 | Li et al. | |
| 2010/0150147 A1* | 6/2010 | Khanduri | H04Q 3/68 370/388 |
| 2012/0117295 A1* | 5/2012 | Gunnam | H03K 19/17736 710/316 |
| 2012/0170575 A1* | 7/2012 | Mehra | H04L 41/00 370/359 |
| 2013/0163607 A1* | 6/2013 | Shukla | H04L 49/357 370/419 |
| 2014/0376546 A1* | 12/2014 | Miller | H04L 49/1515 370/388 |
| 2015/0003477 A1* | 1/2015 | Baeckler | H04L 12/40 370/503 |
| 2015/0088936 A1 | 3/2015 | Wang et al. | |

OTHER PUBLICATIONS

Wikipedia, "Clos network," <https://en.wikipedia.org/wiki/Clos_network>, 6 pages (accessed Aug. 7, 2015).

* cited by examiner

*Primary Examiner* — Brian D Nguyen
(74) *Attorney, Agent, or Firm* — Klarquist Sparkman, LLP

(57) ABSTRACT

Techniques and solutions are provided for calculating bandwidth matrices for multi-stage networks using matrix operations. For example, link status information can be obtained for network devices of the multi-stage network. Using the link status information, link state matrices can be determined representing bandwidth and connectivity between network devices of adjacent stages of the multi-stage network. Bandwidth matrices can then be calculated using the link state matrices. The bandwidth matrices represent how network traffic is distributed to destination devices.

20 Claims, 8 Drawing Sheets

US 9,813,356 B1

CALCULATING BANDWIDTH INFORMATION IN MULTI-STAGE NETWORKS

BACKGROUND

In order to communicate network traffic between a source device and a destination device, packet forwarding networks forward packets between networking devices, such as routers and switches, along the path between the source and the destination. The particular path taken between the source and the destination is determined by a network protocol, such as open shortest path first (OSPF).

While routing protocols such as OSPF can be used to make routing decisions, such routing protocols are complex and require significant computing resources. For example, in a dense network fabric with a large number of routers and switches, a traditional routing protocol such as OSPF can have difficulty making efficient decisions regarding load balancing and network traffic routing.

DETAILED DESCRIPTION

Overview

Figure 1:
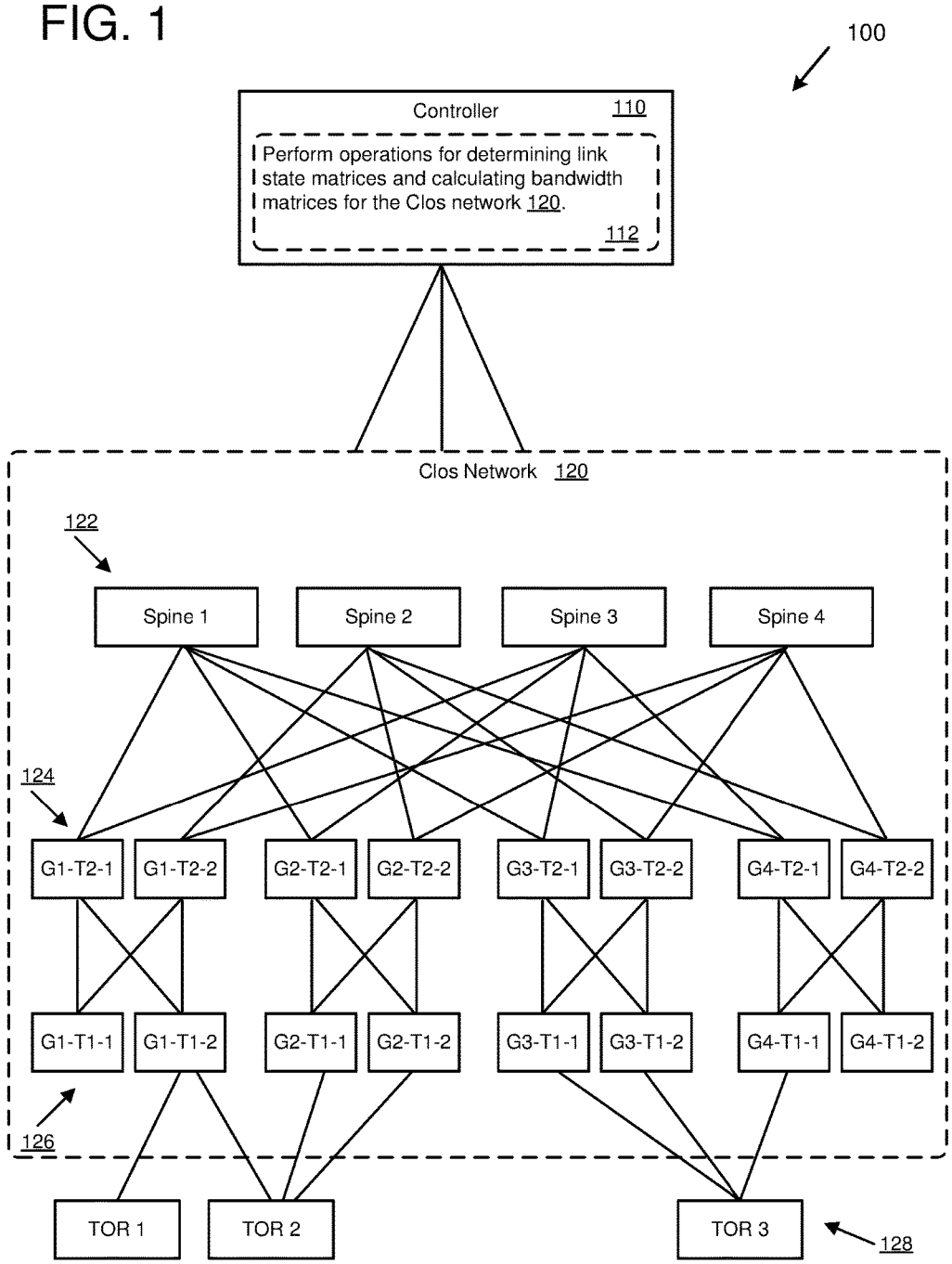
FIG. 1 is a diagram of an example environment in which bandwidth matrices can be calculated for a Clos network.

The following description is directed to techniques and solutions for calculating bandwidth matrices for multi-stage networks (e.g., Clos networks and/or other types of multi-stage networks) using matrix operations. For example, link status information can be obtained for network devices of the multi-stage network. Using the link status information, link state matrices can be determined representing connectivity and bandwidth between the stages of the multi-stage network. Bandwidth matrices can then be calculated, using matrix multiplication operations, from the link state matrices. The bandwidth matrices can be used to distribute network traffic among the network devices of the multi-stage network for ultimate delivery to various external destination devices.

The technologies described herein are implemented within the context of a multi-stage network with a plurality of stages. A multi-stage network is a network in which network devices (routers and/or switches) are organized into a plurality of stages. One type of multi-stage network is a tiered network such as a Clos network (also called a Clos network fabric or a Clos fabric). The network devices in a given stage forward traffic between the network devices in the previous stage and network devices in the next stage. In some types of multi-stage networks, the network devices in a given stage are fully meshed with the network devices in an adjacent stage (e.g., each router in a first stage is connected to every router in a second stage). In other types of multi-stage networks, the network connections between stages are not fully meshed (e.g., a router in a given stage may not be connected to every other router in an adjacent stage). As another example, groups of network devices in adjacent stages can be interconnected within the group, but not interconnected between groups.

In the figures and description herein, a specific type of 3-tier 2×2 Clos network (which is a 5-stage Clos network when unfolded) is used to describe the various technologies. This specific type of Clos network is used as an example network environment to illustrate operation of the technologies described herein. However, the technologies described herein can be implemented in any type of multi-stage network (e.g., a fully meshed multi-stage network or a multi-stage network using other interconnection strategies).

Managing routing within a multi-stage network can be difficult. A multi-stage network operating as a network fabric within a data center can have many network devices. For example, a multi-stage network within a data center could have 3,000 routing devices and 50,000 links between devices. A traditional routing protocol such as OSPF can have problems (e.g., reduced efficiency, routing errors or failures, etc.) in scaling to such a dense network fabric.

In some implementations, the technologies described herein are used to create a control plane protocol managed by a controller (e.g., a server, router, or other type of computing device). The control plane protocol can then be used to make network traffic distribution decisions within the multi-stage network (e.g., instead of, or in addition to, a traditional routing protocol such as OSPF). The controller can obtain connectivity and bandwidth information from the network devices of the multi-stage network, compute convergence information about the multi-stage network fabric, and provide the convergence information to the network devices of the multi-stage network to use for distributing network traffic to various sets of destination devices. The controller can perform these operations offline (e.g., as an external resource outside the multi-stage network).

The matrix multiplication operations described herein can be used to calculate bandwidth matrices and make network traffic distribution decisions in a more efficient manner than a routing protocol such as OSPF. For example, calculating bandwidth matrices using matrix multiplication operations can scale to a dense multi-stage network fabric with many routing devices and associated links. In addition, because the technologies described herein use fewer computing resources (e.g., processing power and memory), the network devices of the multi-stage network can be less capable (e.g., have slower processors, have less memory, etc.).

In some implementations, an external controller device performs at least some of the operations for calculating bandwidth matrices for a multi-stage network. By using an external controller, bandwidth matrices can be efficiently calculated and provided to the network devices of the multi-stage network for use in making network traffic distribution decisions. Because the operations are performed by the controller device, computing resource requirements can be reduced for the network devices within the multi-stage network. In addition, a controller device can utilize specialized hardware to perform the matrix operations even more efficiently. For example, a controller device can comprise graphics processing hardware (e.g., graphics processing units (GPUs)) and/or other specialized hardware can perform matrix operations even more efficiently than a traditional central processing unit (CPU).

Environments for Calculating Bandwidth Matrices

In any of the implementations described herein, bandwidth matrices can be calculated for a multi-stage network (e.g., for a Clos network or another type of tiered network). For example, the network devices (routers and/or switches) of the multi-stage network can use matrix operations to calculate bandwidth matrices. In some implementations, a computing device external to the multi-stage network (e.g., a controller device) receives link information from the network devices of the multi-stage network, calculates bandwidth matrices using the link information and the multi-stage topology, and provides the bandwidth matrices to the network devices of the multi-stage network.

FIG. 1 is a diagram of an example environment 100 in which bandwidth matrices can be calculated for a Clos network. In FIG. 1, an example Clos network 120 is depicted. The Clos network 120 is a specific type of 3-tier 2×2 Clos network (which is a 5-stage Clos network when unfolded) which is used as a simplified example in order to illustrate operation of the various technologies described herein. The first tier is the row of network devices (routers and/or switches) at 126. The second tier is the row of network devices depicted at 124. The third tier, also called the spine tier, is the row of network devices depicted at 122. Other implementations can use a Clos network with a different number of tiers and/or with a different connection strategy than that used in the example Clos network 120. Other implementations can also use a multi-stage network other than a Clos network.

In the example Clos network 120, the first tier and second tier network devices are organized into two by two (2×2) groups. As depicted, there are four groups. The first group groups the network devices G1-T1-1, G1-T1-2, G1-T2-1, and G1-T2-2, and the remaining groups are organized similarly. The designation of each network device in the first tier and second tier identifies which tier and which group the network device belongs to. For example, the network device G1-T1-1 is part of the first group (G1), is in the first tier (T1), and is the first network device in the first group and the first tier (1).

In the example Clos network 120, the network devices of each group are fully interconnected. However, in other implementations, different interconnection strategies can be used. Also, in the example Clos network 120, each group has four network devices (two in the first tier and two in the second tier). However, other implementations may have a different number of network devices in a group (e.g., 16 network devices, 32 network devices, or another number of network devices). For example, a group could have 16 network devices (8 in the first tier and 8 in the second tier) in a fully interconnected arrangement (where each network device in the first tier is connected to every network device in the second tier within a given group). In addition, other implementations may not organize network devices in different tiers into groups.

In the example Clos network 120, the second tier and their tier (the spine tier) are connected in a particular arrangement. Specifically, the spine network devices alternate between connecting to the first network device or the second network device in a given group in the second tier. For example, the network devices designated Spine 1 and Spine 3 are connected to the first network device in each group of the second tier, while the network devices designated Spine 2 and Spine 4 are connected to the second network device in each group of the second tier. Other implementations can use a different connection strategy between the second and third tiers.

In the example environment 100, a number of network devices located outside (external to) the Clos network 120 are depicted that send and receive network traffic via the Clos network 120. These network devices are called "top of rack" (TOR) devices. In some implementations, the TOR devices are network switches that connect to the hosts of a server rack within a data center environment and that communicate data within the data center environment using the Clos network 120. There are three TOR network devices depicted at 128. Each TOR network device connects to one or more of the first tier network devices within the Clos network 120. For example, TOR 2 connects to the network devices designated G1-T1-2, G2-T1-1, and G2-T1-2. Instead of, or in addition to, TOR network devices, other computing devices can connect to the Clos network 120.

In the example environment 100, a controller 110 performs a number of operations for managing network traffic distribution activity for the Clos network 120. For example, as depicted at 112, the controller 110 can perform operations for determining link state matrices and for calculating bandwidth matrices for the Clos network 120.

For example, the controller 110 can be a server, router, or another type of computing device external to the Clos network 120 that manages network traffic distribution activity performed within the Clos network 120. The controller 110 can connect to the network devices of the Clos network 120 via a management plane. For example, in some implementations the controller 110 connects to each network device of the Clos network 120 via a management link (e.g., network port located at each network device of the Clos network 120).

Bandwidth Matrices

In the technologies described herein, bandwidth matrices are calculated for a multi-stage network. Bandwidth matrices represent how network traffic is distributed among the network devices, and as a result among the network connections between the network devices, within the multi-stage network. Different bandwidth matrices can be calculated for different destination devices or sets of destination devices.

Figure 2:
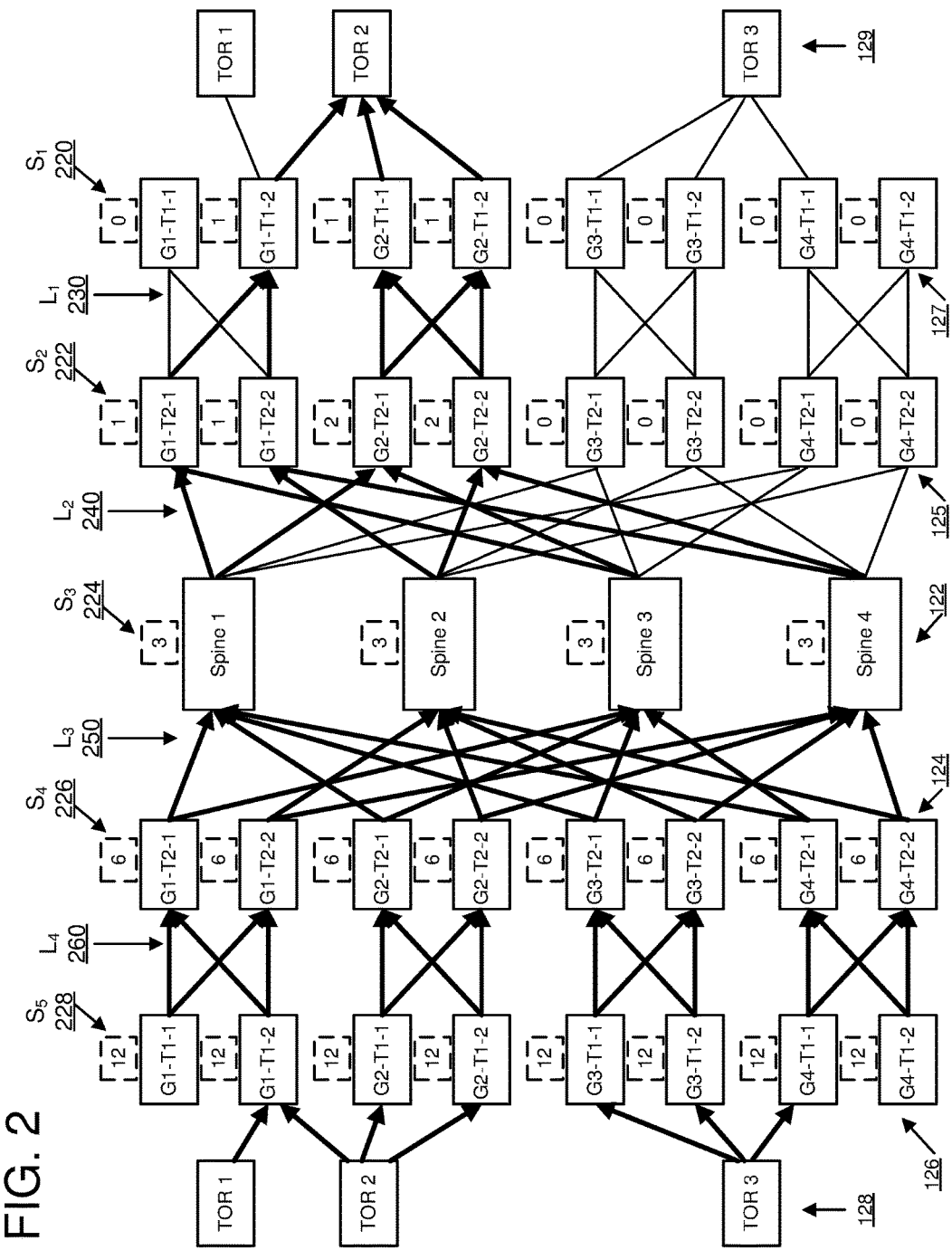
FIG. 2 is a diagram depicting an example unfolded Clos network with bandwidth matrices.

In order to illustrate how bandwidth matrices are defined and calculated, FIG. 2 is provided. FIG. 2 depicts the example Clos network 120 that has been unfolded from a 3-tier representation into a 5-stage unfolded representation. Specifically, in the unfolded Clos network, the network connections between network devices have been split from two-way connections (as depicted in the Clos network 120 represented in FIG. 1) into two one-way connections. The two one-way connections are referred to north bound (NB) connections and south bound (SB) connections. The north bound connections (the left-hand side of the unfolded Clos network) carry network traffic from the TOR devices (depicted at 128 on the left), to the tier one devices (depicted at 126 on the left), to the tier two devices (depicted at 124 on the left), and then to the tier three (spine) devices (depicted at 122). The north bound connections can also be referred to as uplink connections. The south bound connections (the right-hand side of the unfolded Clos network) carry network traffic from the tier three (spine) devices (depicted at 122), to the tier two devices (depicted at 125 on the right), to the tier one devices (depicted at 127 on the right), and then to the TOR devices (depicted at 129 on the right). By unfolding the Clos network, network traffic can be more easily represented as it travels from a source TOR device through the Clos network and back to a destination TOR device. It should be noted that the same TOR devices, first tier devices, and second tier devices are depicted both on the left hand side and right hand side of FIG. 2. Specifically, the TOR devices depicted at 128 and 129 are the same TOR devices, just depicted in two different locations to show the Clos network in an unfolded manner (similarly, the first tier devices 126 and 127 are the same devices, and the second tier devices 124 and 125 are the same devices).

In FIG. 2, bandwidth matrices are shown for the five stages of the 5-stage unfolded Clos network. Bandwidth matrices are column matrices that represent how network traffic is distributed among the network devices to a destination (e.g., one or more TORs). In other words, a given bandwidth matrix for a given stage defines how network traffic is distributed among the network devices of the stage for a given destination or destinations. Each stage has its own bandwidth matrix.

In FIG. 2, bandwidth matrices are depicted for a destination of the TOR 2 network device. In order to determine the bandwidth matrices for TOR 2, bandwidth and connectivity for the egress stage is determined. The egress stage 127 (the last stage in the 5-stage unfolded Clos network, also called the egress stage because it is the stage where network traffic leaves the Clos network for its destination device) bandwidth matrix $S_1$ 220 is determined, as depicted by the dashed line boxes above each routing device in stage 127. Specifically, a given matrix location is set to a zero if the corresponding network device cannot forward network packets directly to TOR 2, and set to a one if the corresponding network device can forward network packets directly to TOR 2. As depicted, there are three network devices that can forward network packets directly to TOR 2 (G1-T1-2, G2-T1-1, and G2-T1-2), which is also illustrated by the bold arrows. Therefore, the matrix elements for G1-T1-2, G2-T1-1, and G2-T1-2 are set to one, while the others are set to zero. The elements of the column matrix for bandwidth matrix $S_1$ 220 are (0 1 1 1 0 0 0 0).

In the example depicted in FIG. 2, the Clos network is a fully provisioned Clos network in which all network links have the same bandwidth (e.g., all of the network connections are 1 gigabit connections). Because all network links have the same bandwidth, values of zero and one can be used for the link state matrices and the bandwidth matrix for the egress stage, with the value of zero indicating no network connection is present (or the link is down) and a value of one indicating that the link is up and has the uniform bandwidth (e.g., 1 gigabit). Other implementations can use multiple values to support network links that have different bandwidth capacities (e.g., for a multi-stage network that is not fully provisioned or that otherwise has links of different bandwidth within and/or external to the network).

Working backwards from the egress stage (also called stage 1), the other bandwidth matrices can be calculated for the TOR 2 destination. The stage 125 bandwidth matrix (also referred to as the second tier north-bound bandwidth matrix) is depicted by bandwidth matrix $S_2$ 222. The stage 122 bandwidth matrix (also referred to as the spine bandwidth matrix) is depicted by bandwidth matrix $S_3$ 224. The stage 124 bandwidth matrix (also referred to as the second tier north bound bandwidth matrix) is depicted by bandwidth matrix $S_4$ 226. The stage 126 (also called the ingress stage) bandwidth matrix (also referred to as the first tier north bound bandwidth matrix) is depicted by bandwidth matrix $S_5$ 228. Details of calculating the bandwidth matrices using the link state matrices (e.g., link state matrices $L_1$ 230, $L_2$ 240, $L_3$ 250, and $L_4$ 260) are described in further detail below.

While FIG. 2 illustrates the technology using a Clos network, the same technique can be applied to any type of tiered network with a plurality of tiers. Specifically, the tiered network can be represented in an unfolded state, as a plurality of stages, in which the network connections between network devices have been split from two-way connections (in the tiered representation) into two one-way connections (in the unfolded representation), as illustrated in FIG. 2 with regard to the example Clos network. The stages can be labeled in a similar manner as depicted in FIG. 2, beginning with stage 1 (the egress stage) back to stage N (the ingress stage), where the multi-stage network as N stages. As with the 3-tier Clos network depicted in FIG. 2, a tiered network with three tiers would have five stages. As another example, a tiered network with four tiers would have seven stages.

Link State Matrices

In the technologies described herein, link state matrices are determined for a multi-stage network. Link state matrices indicate the bandwidth capacity of the network links as well as which links within the multi-stage network are up and which links are down. Link state matrices can be used when calculating bandwidth matrices.

With reference to FIG. 2, the below link state matrix $L_1$ 230 (in table format) represents which links within the unfolded Clos network are up, and which are down, between stage 127 and stage 125 (between the network devices depicted at stages 125 and 127). Links which are up are have a value of one and links which are down (or do not exist) have a value of zero. In addition, because all links in this example have the same bandwidth capacity, a value of one indicates that the network bandwidth of the link. As can be seen in Table 1 below, all of the existing links between the tier one and tier two network devices are up.

TABLE 1

Example Link State Matrix for $L_1$ 230

|  | G1-T2-1 | G1-T2-2 | G2-T2-1 | G2-T2-2 | G3-T2-1 | G3-T2-2 | G4-T2-1 | G4-T2-2 |
| --- | --- | --- | --- | --- | --- | --- | --- | --- |
| G1-T1-1 | 1 | 1 | 0 | 0 | 0 | 0 | 0 | 0 |
| G1-T1-2 | 1 | 1 | 0 | 0 | 0 | 0 | 0 | 0 |
| G2-T1-1 | 0 | 0 | 1 | 1 | 0 | 0 | 0 | 0 |
| G2-T1-2 | 0 | 0 | 1 | 1 | 0 | 0 | 0 | 0 |
| G3-T1-1 | 0 | 0 | 0 | 0 | 1 | 1 | 0 | 0 |
| G3-T1-2 | 0 | 0 | 0 | 0 | 1 | 1 | 0 | 0 |

TABLE 1-continued

Example Link State Matrix for $L_1$ 230

|       | G1-T2-1 | G1-T2-2 | G2-T2-1 | G2-T2-2 | G3-T2-1 | G3-T2-2 | G4-T2-1 | G4-T2-2 |
|-------|---------|---------|---------|---------|---------|---------|---------|---------|
| G4-T1-1 | 0 | 0 | 0 | 0 | 0 | 0 | 1 | 1 |
| G4-T1-2 | 0 | 0 | 0 | 0 | 0 | 0 | 1 | 1 |

Using the bandwidth matrix $S_1$ 220 and the link state matrix $L_1$ 230, the next bandwidth matrix $S_2$ 222 is calculated using matrix multiplication. Specifically, bandwidth matrix $S_2$ 222 is calculated by multiplying $L_1$ 230 by $S_1$ 220. The resulting bandwidth matrix $S_2$ 222 is the column of values (1 1 2 2 0 0 0 0). Next, the bandwidth matrix $S_3$ 224 is calculated by multiplying $L_2$ 240 by $S_2$ 222. Next, the bandwidth matrix $S_4$ 226 is calculated by multiplying $L_3$ 250 by $S_3$ 224. Finally, the bandwidth matrix $S_5$ 228 is calculated by multiplying $L_4$ 260 by $S_4$ 226.

The resulting set of bandwidth matrices $S_1$ 220, $S_2$ 222, $S_3$ 224, $S_4$ 226, and $S_5$ 228 are then used by the network to distribute network traffic for the destination device, which is TOR 2 in this example. For example, if network traffic destined for TOR 2 is being received at network device G1-T1-2 at the ingress stage 126, then network device G1-T1-2 would distribute the network traffic among the next-hop network devices according to the bandwidth matrix of the next-hop. Using the example bandwidth matrix values in FIG. 2, network device G1-T1-2 would distribute the network traffic among the next-hop network devices G1-T2-1 and G1-T2-2 (at stage four 124) according to the bandwidth matrix $S_4$ 226, which has a value of "6" for G1-T2-1 and a value of "6" for G1-T2-2. In some implementations, the bandwidth matrix values are used to determine a ratio and the network bandwidth is distributed according to the ratio (e.g., substantially equal to the ratio). In this example, the ratio would be 6:6 (i.e., 1:1, which would be an equal split between the two next-hop network devices).

However, the split of network traffic may not always be an even split. For example, consider network device Spine 1 (at stage three 122) that is receiving network traffic for ultimate delivery to TOR 2. Network device Spine 1 would distribute the network traffic over the next-hop network devices that have a path to TOR 2 (the network devices in the next downstream stage which is stage two 125 in this example), which are network devices G1-T2-1 and G2-T2-1 (at stage two 125). In this case, the ratio would be 1:2 using the values of the bandwidth matrix $S_2$ 222 (e.g., resulting in approximately twice the amount of bandwidth traveling via network device G2-T2-1, which has two network links to TOR 2, as via network device G1-T2-1, which only has one network link to TOR 2).

In some implementations, the link bandwidth capacity is not the same across all links. In such implementations, a variety of values can be used for the link state matrices (instead of just zero and one). For example, in addition to the value of zero (when a link is not present or down), a number of values can be used to indicate a number of different bandwidth capacities. For example, a value of one can be used to indicate a 10 gigabit link, a value of four can be used to indicate a 40 gigabit link, and a value of ten can be used to indicate a 100 gigabit link. To illustrate the use of multiple bandwidth values in the link state matrices, Table 2 below provides an alternate link state matrix for $L_1$ 230 in which the four links have a value of "4" (e.g., 40 gigabit links) and twelve links have a value of "1" (e.g., 10 gigabit links).

TABLE 2

Example Link State Matrix for $L_1$ 230 using multiple bandwidth values

|       | G1-T2-1 | G1-T2-2 | G2-T2-1 | G2-T2-2 | G3-T2-1 | G3-T2-2 | G4-T2-1 | G4-T2-2 |
|-------|---------|---------|---------|---------|---------|---------|---------|---------|
| G1-T1-1 | 1 | 1 | 0 | 0 | 0 | 0 | 0 | 0 |
| G1-T1-2 | 1 | 1 | 0 | 0 | 0 | 0 | 0 | 0 |
| G2-T1-1 | 0 | 0 | 4 | 4 | 0 | 0 | 0 | 0 |
| G2-T1-2 | 0 | 0 | 4 | 4 | 0 | 0 | 0 | 0 |
| G3-T1-1 | 0 | 0 | 0 | 0 | 1 | 1 | 0 | 0 |
| G3-T1-2 | 0 | 0 | 0 | 0 | 1 | 1 | 0 | 0 |
| G4-T1-1 | 0 | 0 | 0 | 0 | 0 | 0 | 1 | 1 |
| G4-T1-2 | 0 | 0 | 0 | 0 | 0 | 0 | 1 | 1 |

Using Table 2 to re-calculate bandwidth matrix $S_2$ 222 results in the column of values (1 1 8 8 0 0 0 0).

Figure 3:
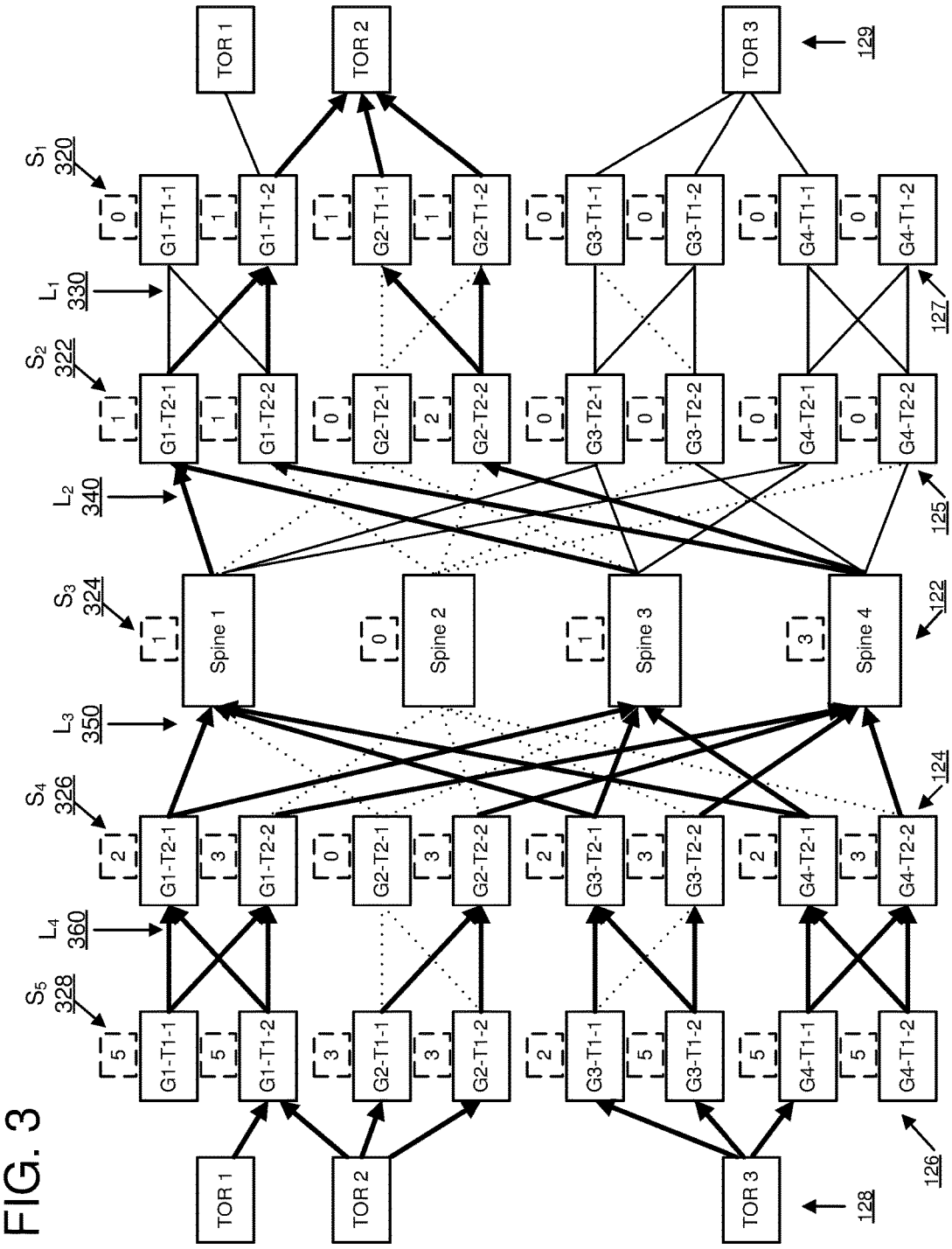
FIG. 3 is a diagram depicting an example unfolded Clos network in which bandwidth matrices are calculated using link state matrices.

FIG. 3 depicts the example unfolded Clos network from FIG. 2 in which some of the links between the network devices are down. Specifically, the links that are down are depicted as dotted lines (e.g., between G2-T1-1 and G2-T2-1 and between G2-T1-2 and G2-T2-1), while the links that are up are depicted as solid lines. In this example unfolded Clos network, links have been marked down in a symmetric manner for ease of illustration, meaning that if a specific link is marked down then it is down for both north bound and south bound directions (e.g., the north bound link between G2-T1-1 and G2-T2-1, between 126 and 124, and the south bound link between G2-T2-1 and G2-T1-1, between 125 and 127, are both marked down). However, in some implementations, north bound and south bound links may be down independently.

FIG. 3 can be used to describe link state matrices in further detail in an unfolded Clos network in which some of links are down. As depicted in FIG. 3, there 5-stage unfolded Clos network has four link state matrices, $L_1$ 330, $L_2$ 340, $L_3$ 350, and $L_4$ 360. For the link state matrices, the rows are the source network devices and the columns are the destination network devices.

The $L_1$ 330 link state matrix represents link bandwidth (in this example, the links are of uniform bandwidth, so only one bandwidth value is used) and whether a link is up or down (or not present) between the devices of stage 125 and stage 127. As depicted in FIG. 3, there are three links down between these stages (between G2-T1-1 and G2-T2-1, between G2-T2-1 and G2-T1-2, and between G3-T2-2 and G3-T1-1). The $L_1$ 330 link state matrix is depicted below (in table format) as Table 3.

TABLE 3

Example Link State Matrix for $L_1$ 330

|  | G1-T1-1 | G1-T1-2 | G2-T1-1 | G2-T1-2 | G3-T1-1 | G3-T1-2 | G4-T1-1 | G4-T1-2 |
|---|---|---|---|---|---|---|---|---|
| G1-T2-1 | 1 | 1 | 0 | 0 | 0 | 0 | 0 | 0 |
| G1-T2-2 | 1 | 1 | 0 | 0 | 0 | 0 | 0 | 0 |
| G2-T2-1 | 0 | 0 | 0 | 0 | 0 | 0 | 0 | 0 |
| G2-T2-2 | 0 | 0 | 1 | 1 | 0 | 0 | 0 | 0 |
| G3-T2-1 | 0 | 0 | 0 | 0 | 1 | 1 | 0 | 0 |
| G3-T2-2 | 0 | 0 | 0 | 0 | 0 | 1 | 0 | 0 |
| G4-T2-1 | 0 | 0 | 0 | 0 | 0 | 0 | 1 | 1 |
| G4-T2-2 | 0 | 0 | 0 | 0 | 0 | 0 | 1 | 1 |

Working backward from the egress stage 127 (from right to left), the next link state matrix depicted in FIG. 3 is $L_2$ 340. The $L_2$ 340 link state matrix represents link bandwidth and whether a link is up or down (or not present) between stage 122 (the spine tier) and stage 125. The $L_2$ 340 link state matrix is depicted below (in table format) as Table 4.

TABLE 4

Example Link State Matrix for $L_2$ 340

|  | G1-T2-1 | G1-T2-2 | G2-T2-1 | G2-T2-2 | G3-T2-1 | G3-T2-2 | G4-T2-1 | G4-T2-2 |
|---|---|---|---|---|---|---|---|---|
| Spine 1 | 1 | 0 | 0 | 0 | 1 | 0 | 1 | 0 |
| Spine 2 | 0 | 0 | 0 | 0 | 0 | 0 | 0 | 0 |
| Spine 3 | 1 | 0 | 0 | 0 | 1 | 0 | 1 | 0 |
| Spine 4 | 0 | 1 | 0 | 1 | 0 | 1 | 0 | 1 |

The next link state matrix is $L_3$ 350. The $L_3$ 350 link state matrix represents link bandwidth and whether a link is up or down (or not present) between stage 124 and stage 122. The $L_3$ 350 link state matrix can be obtained by transposing the $L_2$ 340 link state matrix when links are down symmetrically.

The final link state matrix is $L_4$ 360. The $L_4$ 360 link state matrix represents link bandwidth and whether a link is up or down (or not present) between stage 126 (the ingress stage) and stage 124. The $L_4$ 360 link state matrix can be obtained by transposing the $L_1$ 330 link state matrix when links are down symmetrically.

Calculating Bandwidth Matrices

In some implementations, a set of bandwidth matrices are calculated for one or more destination devices that are reachable by the same network devices in the final, or egress, stage. The set of bandwidth matrices are used to distribute network traffic among the network devices of the multi-stage network for the one or more destination devices. Using the set of bandwidth matrices, the network devices of the multi-stage network can determine how to distribute network traffic among the network devices of the next-hop stage and ultimately to the one or more destination devices.

In some implementations, in order to calculate a set of bandwidth matrices for one or more destination devices, the bandwidth matrix for the egress stage is first determined. With reference to FIG. 3, link status information can be obtained indicating bandwidth information (e.g., network link capacity, such as 1 gigabit, 10 gigabit, etc.) and which links are present between stage 127 (the egress stage) for one or more selected TOR destination devices. As depicted in FIG. 3, the destination has been set to TOR 2, which is connected to G1-T1-2, G2-T1-1, and G2-T1-2. Therefore, the bandwidth matrix $S_1$ 320 for stage 127 is the column of values (0 1 1 1 0 0 0 0). As an alternate example, in an implementation where links have different bandwidth capacities (e.g., "1" for 1 gigabit and "4" for 4 gigabit), the bandwidth matrix could be (0 4 1 1 0 0 0 0) indicating that one of the links is a 4 gigabit link and the other two are 1 gigabit links.

Matrix multiplication operations are then used to calculate the bandwidth matrices for the other stages working backward from the egress bandwidth matrix (backward bandwidth matrix $S_1$ 320 in this example). The equation used to calculate the next bandwidth matrix is:

$$S_2 = L_1 \times S_1$$

In other words, the bandwidth matrix for stage 125 is equal to the link state matrix $L_1$ 330 multiplied by the bandwidth matrix stage $S_1$ 320. Using the values in Table 3 above for link state matrix $L_1$ 330 (reflecting the link up/down state depicted in FIG. 3) and the values depicted in FIG. 4 for the bandwidth matrix $S_1$ 320, the following matrix multiplication (Calculation 1) calculates $S_2$ 322.

$$\begin{pmatrix} 1 & 1 & 0 & 0 & 0 & 0 & 0 & 0 \\ 1 & 1 & 0 & 0 & 0 & 0 & 0 & 0 \\ 0 & 0 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 1 & 0 & 0 \\ 0 & 0 & 0 & 0 & 0 & 0 & 1 & 1 \\ 0 & 0 & 0 & 0 & 0 & 0 & 1 & 1 \end{pmatrix} \times \begin{pmatrix} 0 \\ 1 \\ 1 \\ 1 \\ 0 \\ 0 \\ 0 \\ 0 \end{pmatrix} = \begin{pmatrix} 1 \\ 1 \\ 0 \\ 2 \\ 0 \\ 0 \\ 0 \\ 0 \end{pmatrix} \quad \text{Calculation 1}$$

$$L_1 \times S_1 = S_2$$

According to Calculation 1 above, $S_2$ 322 is the column of values (1 1 0 2 0 0 0 0). This result is depicted in FIG. 3 as the values in the dashed boxes of bandwidth matrix $S_2$ 322.

The equation used to calculate the next bandwidth matrix is:

$$S_3 = L_2 \times S_2$$

In other words, the bandwidth matrix for stage 122 is equal to the link state matrix $L_2$ 340 multiplied by the bandwidth matrix $S_2$ 322. Using the values in Table 4 above for link state matrix $L_2$ 340 and the values calculated above in Calculation 1 for the bandwidth matrix $S_2$ 322, the following matrix multiplication (Calculation 2) calculates $S_3$ 324.

$$\begin{pmatrix} 1 & 0 & 0 & 0 & 1 & 0 & 1 & 0 \\ 0 & 0 & 0 & 0 & 0 & 0 & 0 & 0 \\ 1 & 0 & 0 & 0 & 1 & 0 & 1 & 0 \\ 0 & 1 & 0 & 1 & 0 & 1 & 0 & 1 \end{pmatrix} \times \begin{pmatrix} 1 \\ 1 \\ 0 \\ 2 \\ 0 \\ 0 \\ 0 \\ 0 \end{pmatrix} = \begin{pmatrix} 1 \\ 0 \\ 1 \\ 3 \end{pmatrix} \quad \text{Calculation 2}$$

$$L_2 \times S_2 = S_3$$

According to Calculation 2 above, the bandwidth matrix $S_3$ 324 is the column of values (1 0 1 3). This result is depicted in FIG. 3 as the values in the dashed boxes for bandwidth matrix $S_3$ 324.

The equation used to calculate the next bandwidth matrix is:

$$S_4 = L_3 \times S_3$$

In other words, the bandwidth matrix for stage 124 is equal to the link state matrix $L_3$ 350 multiplied by the bandwidth matrix $S_3$ 324. Because the links in the unfolded Clos network are symmetric and are marked down together (if a given link is down, both its north bound and south bound components are down), the values for the link state matrix $L_3$ 350 are obtained by transposing the link state matrix $L_2$ 340 (transposing the matrix depicted above in Table 4 so that the four spine network devices are the columns and the eight second tier network devices are the rows). The following matrix multiplication (Calculation 3) calculates $S_4$ 326 using the link state matrix $L_3$ 350 and the values calculated above in Calculation 2 for the bandwidth matrix $S_3$ 324.

$$\begin{pmatrix} 1 & 0 & 1 & 0 \\ 0 & 0 & 0 & 1 \\ 0 & 0 & 0 & 0 \\ 0 & 0 & 0 & 1 \\ 1 & 0 & 1 & 0 \\ 0 & 0 & 0 & 1 \\ 1 & 0 & 1 & 0 \\ 0 & 0 & 0 & 1 \end{pmatrix} \times \begin{pmatrix} 1 \\ 0 \\ 1 \\ 3 \end{pmatrix} = \begin{pmatrix} 2 \\ 3 \\ 0 \\ 3 \\ 2 \\ 3 \\ 2 \\ 3 \end{pmatrix} \quad \text{Calculation 3}$$

$$L_3 \times S_3 = S_4$$

According to Calculation 3 above, the bandwidth matrix $S_4$ 326 is the column of values (2 3 0 3 2 3 2 3). This result is depicted in FIG. 3 as the values in the dashed boxes for bandwidth matrix $S_4$ 326.

The equation used to calculate the next bandwidth matrix is:

$$S_5 = L_4 \times S_4$$

In other words, the bandwidth matrix for stage 126 is equal to the link state matrix $L_4$ 360 multiplied by the bandwidth matrix $S_4$ 326. Because the links in the unfolded Clos network are symmetric and are marked down together (if a given link is down, both its north bound and south bound components are down), the values for the link state matrix $L_4$ 360 is obtained by transposing the link state matrix $L_1$ 330 (transposing the matrix depicted above in Table 3). The following matrix multiplication (Calculation 4) calculates $S_5$ 328 using the link state matrix $L_4$ 360 and the values calculated above in Calculation 3 for the bandwidth matrix $S_4$ 326.

$$\begin{pmatrix} 1 & 1 & 0 & 0 & 0 & 0 & 0 & 0 \\ 1 & 1 & 0 & 0 & 0 & 0 & 0 & 0 \\ 0 & 0 & 0 & 1 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 1 & 1 \end{pmatrix} \times \begin{pmatrix} 2 \\ 3 \\ 0 \\ 3 \\ 2 \\ 3 \\ 2 \\ 3 \end{pmatrix} = \begin{pmatrix} 5 \\ 5 \\ 3 \\ 3 \\ 2 \\ 5 \\ 5 \\ 5 \end{pmatrix} \quad \text{Calculation 4}$$

$$L_4 \times S_4 = S_5$$

According to Calculation 4 above, the bandwidth matrix $S_5$ 328 is the column of values (5 5 3 3 2 5 5 5). This result is depicted in FIG. 3 as the values in the dashed boxes for bandwidth matrix $S_5$ 328.

In the same manner as described above with regard to the example 5-stage unfolded 3-tier Clos network (e.g., illustrated in FIG. 2 and FIG. 3), bandwidth matrices can be calculated for a multi-stage network (e.g., a Clos network or another type of multi-stage network) with any number of stages, with any number of network devices per stage, and with various types of network connection strategies between devices of adjacent stages.

A set of bandwidth matrices can be calculated for one or more destinations where the one or more destinations have the same reachability (the same unique connectivity pattern) from the egress stage network devices (e.g., depicted at 127). For example, one set of bandwidth matrices is depicted in FIG. 3 for the specific destination TOR 2. Another set of bandwidth matrices can be calculated, for example, for the destination TOR 1, which would have the bandwidth matrix S (0 1 0 0 0 0 0 0).

As discussed above, bandwidth matrices are defined for a specific group of destination devices (one or more destination devices) which can be represented by a specific unique connectivity pattern at a specific stage (a one column matrix for an egress stage). However, in some implementations, a bandwidth matrix is extended to support a plurality of different destination groups (a plurality of different unique connectivity patterns). In such implementations, an M×N extended reachability matrix R is generated for a given stage, defined for M routers and N destinations at the given stage. In other words, instead of a 1-dimensional bandwidth matrix representing one unique connectivity pattern, a 2-dimensional bandwidth matrix is used representing N unique connectivity patterns. By using extended bandwidth matrices, the overall number of matrix multiplications needed for calculating the bandwidth matrices for N destinations can be reduced by a factor of N.

Methods for Calculating Bandwidth Matrices

In any of the technologies described herein, methods can be provided for calculating bandwidth matrices for multi-stage networks. For example, bandwidth matrices can be calculated for one or more destination devices connected to the multi-stage network (e.g., TOR network devices) using matrix multiplication operations. For example, connectivity information (e.g., link status information and/or other topology or connection information regarding the multi-stage network) can be obtained and used to determine link state matrices. Bandwidth matrices can then be calculated for specific destination devices using the link state matrices.

Figure 4:
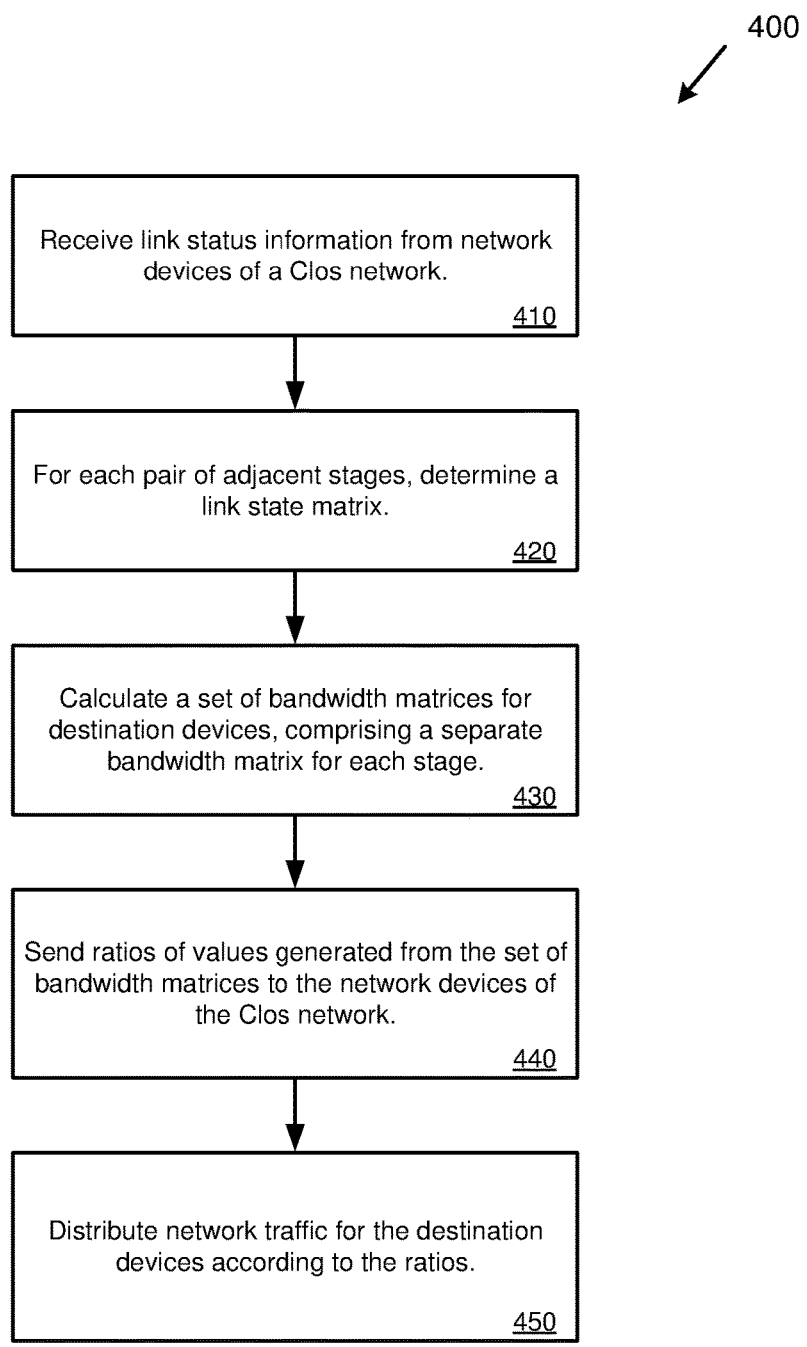
FIGS. 4 and 5 are flowcharts of example methods for calculating bandwidth matrices for multi-stage networks.

FIG. 4 is a flow chart of an example method 400 for calculating bandwidth matrices for a Clos network (or for another type of tiered network) by a controller device, such as controller 110. The Clos network comprises a plurality of tiers, with each tier comprising a plurality of network devices (routers and/or switches). The Clos network is represented by an unfolded Clos network having a plurality of stages. For example, a 3-tier Clos network is represented as an unfolded Clos network with 5 stages.

At 410, link status information is received from network devices of the Clos network. For example, each network device of the Clos network can provide information (e.g., to the controller device) indicating link status (e.g., for links directly connected to the network device). For example, the link status information can indicate link bandwidth (e.g., 1 gigabit, 10 gigabits, etc.) as well as link connectivity indicating links that are down (or not present). In some implementations, link status information represents the status of bi-directional links which are marked up or down for both directions of the link. In some implementations, link status information represents up and down status for each direction independently. In some implementations, additional connectivity information is received (e.g., information indicating the Clos topology and/or information indicating which destination devices are connected to which network devices of the Clos network).

At 420, a link state matrix is determined for each pair of adjacent stages of the Clos network using, at least in part, the link status information. For example, if the Clos network has 5 stages in an unfolded representation, then four link state matrices would be determined, one between stages 1 and 2, one between stages 2 and 3, one between stages 3 and 4, and one between stages 4 and 5.

At 430, a set of bandwidth matrices is calculated for one or more destination devices. The set of bandwidth matrices comprises a separate bandwidth matrix for each stage. The set of bandwidth matrices can be calculated beginning with the egress stage and moving backward to the first stage (the ingress stage). The bandwidth matrices representing how network traffic is distributed to the one or more destination devices.

At 440, ratios of values generated from the set of bandwidth matrices are sent to the network devices of the Clos network. For example, the network devices of each stage can receive their respective subset of the ratios along with an indication of the destination devices to which the ratios apply. The subset of ratios for a given stage can include ratios for next-stage network devices so that the given stage can distribute network traffic among the next-stage network devices.

At 450, network traffic for the one or more destination devices is distributed according to the ratios. For example, when network traffic for the one or more destination devices is received at a given stage, the network devices of the given stage can use the ratios for distributing the received network traffic among network devices of the next-hop stage.

Figure 5:
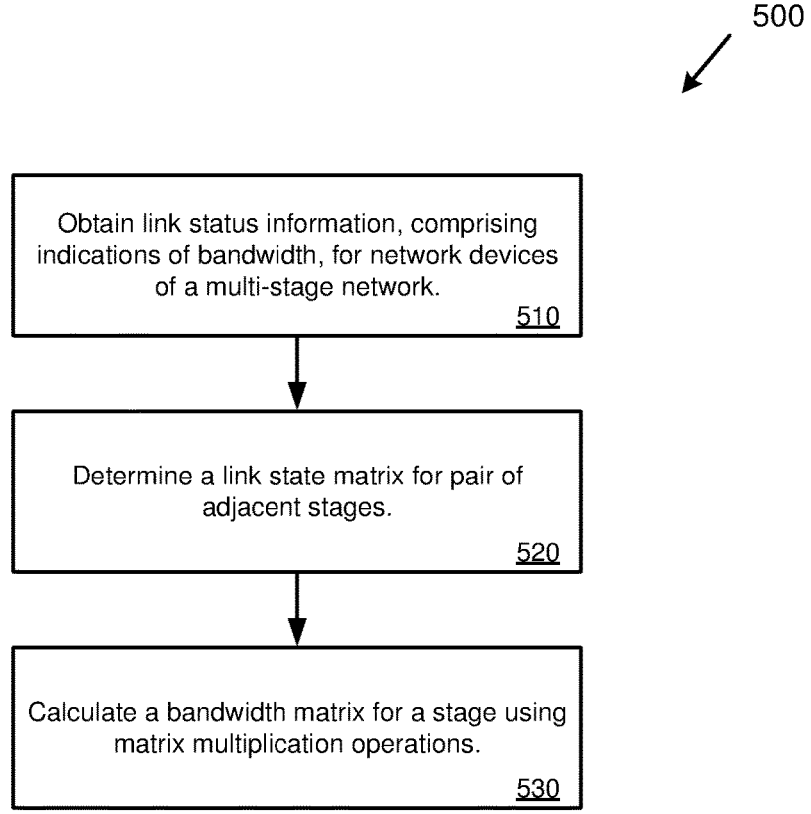

FIG. 5 is a flow chart of an example method 500 for calculating bandwidth matrices for a multi-stage network (e.g., a Clos network or another type of tiered network). The example method 500 can be performed by a controller device, such as controller 110 and/or by network devices (routers and/or switches) of the multi-stage network. The multi-stage network comprises a plurality of stages, with each stage comprising a plurality of network devices.

At 510, link status information is obtained for network devices of the multi-stage network. For example, a controller device can obtain link status information from network devices of the multi-stage network and/or individual network devices of the multi-stage network can obtain link status information. In some implementations, additional connectivity information is obtained (e.g., information indicating the topology of the multi-stage network and/or information indicating which destination devices are connected to which network devices of the multi-stage network). In some implementations, the network links are all of uniform bandwidth capacity (e.g., all 10 gigabit links), and in such implementations only two values may be needed to represent connectivity and bandwidth (e.g., a "0" indicating a link is down or not present and a "1" indicating a link that is up and that has a 10 gigabit capacity). In some implementations, multiple bandwidth values can be used to support multiple bandwidth capacities (e.g., a "0" indicating a link is down or not present, a "1" indicating a 10 gigabit link, a "4" indicating a 40 gigabit link, and a "10" indicating a 100 gigabit link).

At 520, a link state matrix is determined for a pair of adjacent stages of the multi-stage network using, at least in part, the link status information. The link state matrix represents network bandwidth between the network devices of the pair of adjacent stages.

At 530, a bandwidth matrix is calculated for a stage of the multi-stage network. The bandwidth matrix represents how network traffic is distributed for a destination device. For example, the network devices use a ratio of values from the bandwidth matrix to distribute network traffic among network devices of a next-hop stage. In some implementations, additional bandwidth matrices are calculated to create a set of bandwidth matrices, one for each stage.

Figure 6:
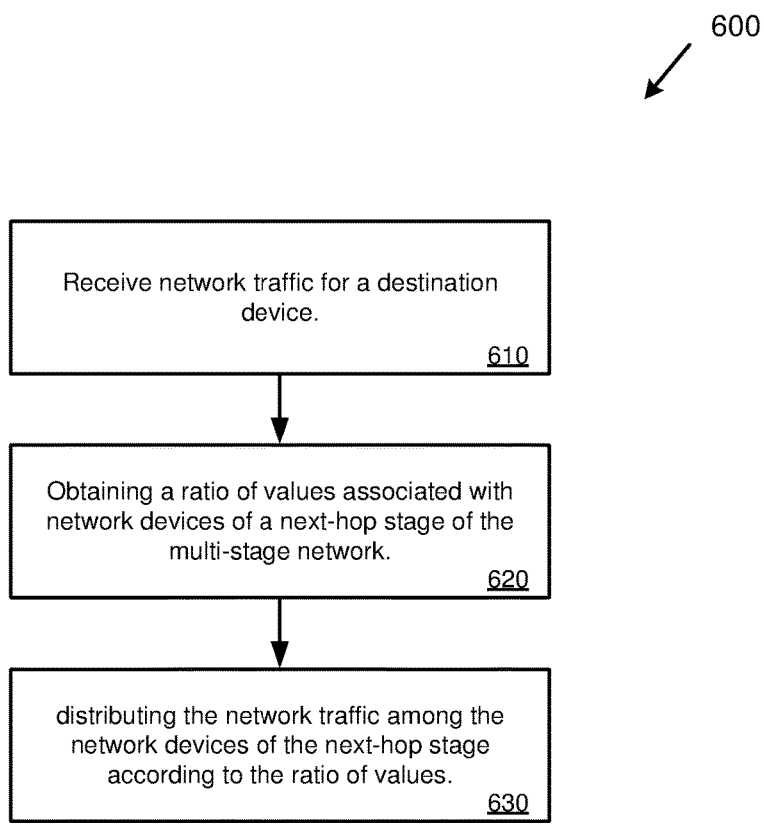
FIG. 6 is a flowchart of an example method for distributing network traffic according to bandwidth matrices in a multi-stage network.

FIG. 6 is a flow chart of an example method 600 for performing network traffic distribution operations within a multi-stage network using bandwidth matrices (e.g., a Clos network or another type of tiered network). The example method 600 can be performed by a controller device, such as controller 110 and/or by network devices (routers and/or switches) of the multi-stage network. The multi-stage network comprises a plurality of stages, with each stage comprising a plurality of network devices.

At 610, network traffic is received for a destination device. The destination device is external to the multi-stage network (e.g., a top-of-rack switch reachable via an egress stage of the multi-stage network, such as TOR 2 depicted in FIGS. 2 and 3).

At 620, a ratio of values is obtained. The ratio of values is associated with network devices of a next-hop stage of the multi-stage network and indicates how network bandwidth is distributed among the network devices of the next-hop stage. The ratio of values comes from a bandwidth matrix which is calculated with matrix multiplication operations using a link state matrix. The bandwidth matrix represents how network traffic is distributed for the destination device.

At 630, the network traffic is distributed among the network devices of the next-hop stage according to the ratio of values. For example, the ratio can be calculated (e.g., by a controller device) by identifying the network devices in the next-hop stage that have a path to the destination device (e.g., that have a bandwidth value in the matrix that is not zero) and using the bandwidth values from the bandwidth matrix for those identified network devices to calculate the ratio, which may be a ratio between one, two, three, or more network devices in the next-hop stage.

Example Implementation for Calculating Bandwidth Matrices

This section describes procedures for calculating bandwidth matrices in a fully populated Clos network where each of the paths between a source and a destination should be treated equally because the network links all have the same bandwidth. In other words, in such a Clos network, each path represents a unit of bandwidth, and the number of different paths represent the available bandwidth (e.g., in a Clos network with 1 gigabit network links, a network device with two paths to a destination would have a corresponding available bandwidth of 2 gigabits).

Given a Clos network and a set of destination routers (in the last stage which is the egress stage), consider a router. It may or may not be a last-stage router. If it is a last-stage router, the number of possible paths from it to a destination device outside the Clos network is either 1 or 0:
  1 if the router is a destination router itself:
    It has one path (of zero length) to itself;
    It has no path to any other destination router.
  0 if the router is not a destination router itself:
    It has no path to any of the destination routers.

If the router is not a last-stage router, any possible path to any of the destination routers would be via one of its next-hop routers in the next stage; the number of paths from the router to any of the destination routers would therefore equal the sum of number of paths from each of the next-hop routers to which the router has a link.

To formalize this, consider an S-stage Clos network (S is an odd integer). For each stage $s \in \mathbb{Z}$, $1 \leq s \leq S$, let $w_s$ be the number of routers in the stage, and let $r_{s,i}$ denote the i-th router in the stage. Let $P_s$ be the $w_s \times 1$ column matrix, where the each entry $P_s[i,1]$ denotes the number of paths from $r_{s,i}$ to any destination router (a destination router is a router in the last stage that has a path to a destination device outside the Clos network). Let s=1 denote the last (egress) stage, and s=S denote the first (ingress) stage, i.e. stages are numbered backward starting from the egress stage toward the ingress stage.

In the last stage s=1, $P_1$ is defined such that:

$$P_1[i, 1] = \begin{cases} 1 & \text{if and only if } r_{1,i} \text{ is a destination router} \\ 0 & \text{otherwise} \end{cases}$$

In a non-ingress stage s<S and its prior stage s+1, $P_{s+1}[i,1]$ is the sum of number of paths from each of its next-hop routers to which this router has a link. If we let $L_s$ be a $w_{s+1} \times w_s$ matrix such that:

$$L_s[i, j] = \begin{cases} 1 & \text{if and only if there exists a link from } r_{s+1,i} \text{ to } r_{s,j} \\ 0 & \text{otherwise} \end{cases}$$

then:

$$P_{S+1}[i, 1] = \sum_{j=1}^{w_s} L_s[i, j] P_s[j]$$

Generalizing this for each stage $s \in \mathbb{Z}$, $1 \leq s < S$ the following equation is obtained:

$$P_{s+1} = L_s P_s$$

Once $P_s$ has been determined as above for all stages, each non-egress router (i.e. in stage s>1) can determine the number of paths from each of its next-hop routers in the next stage to which it has a link, and since each path is a unit of bandwidth, the ratio of the number of paths from different next-hop routers is used as the ratio of traffic to distribute to those routers. For example, consider a router with three next-hop routers, each of which has 3, 0, and 2 paths to the destination routers respectively. Then the router should distribute traffic to the destinations over the first and the third next-hop routers, in a 3:2 ratio; the second next-hop router has 0 paths to the destinations, i.e. it cannot reach the destinations, and therefore no traffic is forwarded toward via the second next-hop router.

Example Service Provider Environments

Figure 7:
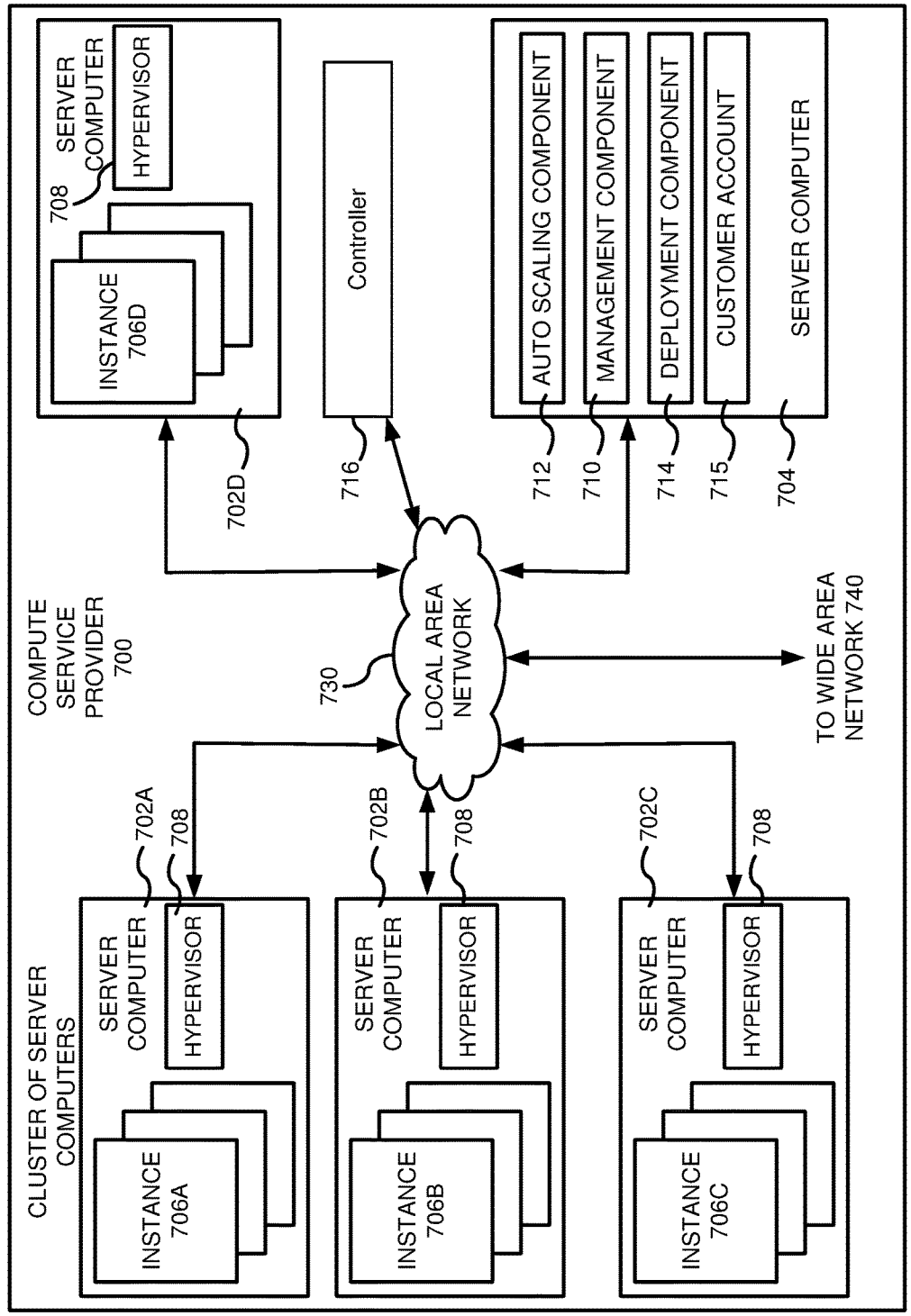
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise a multi-stage network (e.g., a Clos network fabric and/or another type of tiered network fabric) and network devices outside the multi-stage network (e.g., top-of-rack switches, routers, etc.). The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, a controller 716 manages a multi-stage network (part of the local area network 730). For example, the multi-stage network can connect to TOR devices (e.g., network switches) that service the server computers 720A-720D. The controller 716 can receive link status information from the network devices of the multi-stage network, determine link state matrices, and calculate a set of bandwidth matrices for various destination devices.

Figure 8:
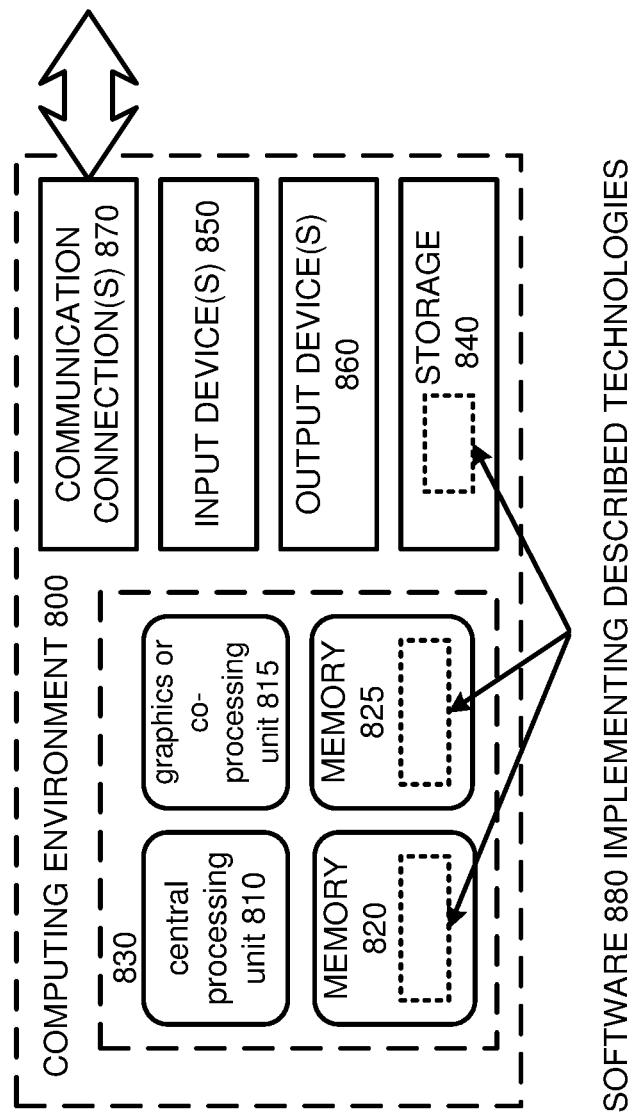
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a controller device, for calculating bandwidth matrices for a Clos network comprising a plurality of tiers, the method comprising:
receiving, by the controller device, link status information indicating link bandwidth and link connectivity from network devices of the Clos network, wherein each tier, of the plurality of tiers, comprises a plurality of network devices, wherein each network device is a switch or a router, and wherein the Clos network is represented by an unfolded Clos network having a plurality of stages;

for each pair of adjacent stages of the plurality of stages:
  determining, by the controller, a link state matrix between the pair of adjacent stages from the link status information, the link state matrix representing link bandwidth and link connectivity between the pair of adjacent stages;
calculating, by the controller using matrix multiplication operations, a set of bandwidth matrices for destination devices, wherein the set of bandwidth matrices comprise a separate bandwidth matrix for each of the plurality of stages representing how network traffic is distributed to the destination devices;
sending, by the controller device, ratios of values generated from the set of bandwidth matrices to the network devices of the Clos network; and
distributing network traffic for the destination devices using the network devices and according to the ratios of values.

2. The method of claim 1 wherein, for each pair of adjacent stages, the link state matrix contains a respective matrix entry for each combination of network devices from the adjacent stages, the matrix entry set to:
  a value of zero when a network connection is down or not present between the combination of network devices; and
  a value of one when the network connection is up between the combination of network devices, the value of one representing a network link bandwidth that is uniform among network links within the Clos network.

3. The method of claim 1 wherein the destination devices are defined by a unique connectivity pattern of network devices in an egress stage of the Clos network.

4. The method of claim 3 wherein additional sets of bandwidth matrices are calculated for additional groups of destination devices, wherein each additional group of destination devices has a unique connectivity pattern in the egress stage of the Clos network.

5. A computing device comprising:
  a processing unit;
  wherein the computing device is configured to use the processing unit to perform operations comprising:
    obtaining link status information for network devices forming a multi-stage network, wherein the link status information indicates network bandwidth between the network devices;
    determining a link state matrix representing network bandwidth between a pair of adjacent stages of the multi-stage network; and
    calculating, using matrix multiplication operations, a bandwidth matrix for a stage of the multi-stage network, the bandwidth matrix representing how network traffic is distributed for a destination device located outside the multi-stage network;
  wherein the network devices of the multi-stage network distribute network traffic for the destination device according to the bandwidth matrix.

6. The computing device of claim 5 wherein network traffic is distributed according to a ratio of values within the bandwidth matrix.

7. The computing device of claim 5 wherein the bandwidth matrix contains a respective value for each network device of the stage, the value indicating network bandwidth for the network device.

8. The computing device of claim 5 wherein the link state matrix contains a respective matrix entry for each combination of network devices from the pair of adjacent stages, the matrix entry set to:
  a first value when a network connection is down or not present between the combination of network devices; and
  a second value, different from the first value, when the network connection is up between the combination of network devices, the second value representing a network bandwidth.

9. The computing device of claim 5 wherein the link state matrix contains a respective matrix entry for each combination of network devices from the pair of adjacent stages, the matrix entry set to:
  a first value when a network connection is down or not present between the combination of network devices; and
  a plurality of other values representing a corresponding plurality of different network bandwidths when the network connection is up between the combination of network devices.

10. The computing device of claim 5 wherein the destination device is defined by a unique connectivity pattern of network devices in an egress stage of the multi-stage network.

11. The computing device of claim 5, the operations further comprising:
  calculating, using matrix multiplication operations, a bandwidth matrix for each remaining stage of the multi-stage network to generate a set of bandwidth matrices representing how network traffic is distributed to the destination device for all stages of the multi-stage network.

12. The computing device of claim 5 wherein the computing device further comprises a graphics processing unit (GPU), and wherein the matrix multiplication operations are performed, at least in part, by the GPU.

13. The computing device of claim 5 wherein each stage of the multi-stage network comprises a plurality of network devices, wherein each network device is a switch or a router.

14. The computing device of claim 5 wherein the bandwidth matrix is part of an extended bandwidth matrix that represents how network traffic is distributed for multiple unique connectivity patterns of destination devices in an egress stage of the multi-stage network.

15. A computer-readable storage medium storing computer-executable instructions for causing a computing device to perform operations, the operations comprising:
  receiving, at a stage of a multi-stage network, network traffic for a destination device located outside the multi-stage network;
  obtaining a ratio of values associated with network devices of a next-hop stage of the multi-stage network, wherein the ratio of values is from a bandwidth matrix calculated with matrix multiplication operations using a link state matrix, the bandwidth matrix representing how network traffic is distributed for the destination device; and
  distributing the network traffic among the network devices of the next-hop stage according to the ratio of values.

16. The computer-readable storage medium of claim 15 wherein the ratio of values is received by network devices of the stage from a controller device, and wherein the ratio of values is determined by the controller device using the bandwidth matrix.

17. The computer-readable storage medium of claim 15 wherein the bandwidth matrix contains a respective value for each network device of the next-hop stage, the value indicating network bandwidth for network links of the network device capable of delivering network traffic to the destination device.

18. The computer-readable storage medium of claim 15 wherein the link state matrix contains a respective matrix entry for each combination of network devices from the stage and the next-hop stage, the matrix entry indicating a network bandwidth.

19. The computer-readable storage medium of claim 15 wherein the link state matrix contains a respective matrix entry for each combination of network devices from the stage and the next-hop stage, the matrix entry set to:
   a value of zero when a network connection is down or not present between the combination of network devices; and
   one of a plurality of positive integer values representing a corresponding plurality of different network bandwidths when the network connection is up between the combination of network devices.

20. The computer-readable storage medium of claim 15 wherein distributing the network traffic comprises:
   determining that a plurality of network devices of the next-hop stage are capable of delivering network traffic to the destination device; and
   distributing the network traffic among the plurality of network devices of the next-hop stage corresponding to the ratio of values.

\* \* \* \* \*